(12) United States Patent
Lin et al.

(10) Patent No.: US 10,876,337 B2
(45) Date of Patent: Dec. 29, 2020

(54) SLIDING HINGE AND ELECTRONIC DEVICE HAVING THE SAME

(71) Applicants: Che-Hsien Lin, Taipei (TW); Ko-Yen Lu, Taipei (TW); Che-Hsien Chu, Taipei (TW); Chun-An Shen, Taipei (TW)

(72) Inventors: Che-Hsien Lin, Taipei (TW); Ko-Yen Lu, Taipei (TW); Che-Hsien Chu, Taipei (TW); Chun-An Shen, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/568,219

(22) Filed: Sep. 11, 2019

(65) Prior Publication Data

US 2020/0080357 A1 Mar. 12, 2020

Related U.S. Application Data

(60) Provisional application No. 62/730,514, filed on Sep. 12, 2018.

(51) Int. Cl.
*E05D 7/00* (2006.01)
*E05D 15/06* (2006.01)

(52) U.S. Cl.
CPC ........ *E05D 15/06* (2013.01); *E05Y 2900/606* (2013.01)

(58) Field of Classification Search
CPC .. E05D 3/12; E05D 3/122; E05D 3/06; E05D 3/10; E05D 11/082; E05D 11/087; E05D 2011/085; G06F 1/1681; G06F 1/1616; G06F 1/1618; G06F 1/168; E05Y 2900/606; E05Y 2900/602; H04M 1/0216; H04M 1/0222; H04M 1/022; H05K 5/0226; Y10T 16/547; Y10T 16/541

See application file for complete search history.

(56) References Cited

U.S. PATENT DOCUMENTS

| 8,250,711 | B1 * | 8/2012 | Chen | .................. E05D 15/58 16/354 |
|---|---|---|---|---|
| 8,272,104 | B2 * | 9/2012 | Chen | .................. G06F 1/1616 16/354 |
| 8,347,461 | B2 * | 1/2013 | Chen | .................. G06F 1/1624 16/354 |
| 8,559,623 | B2 * | 10/2013 | Chen | .................. G06F 1/1624 379/433.12 |

(Continued)

*Primary Examiner* — Chuck Y Mah
(74) *Attorney, Agent, or Firm* — JCIPRNET

(57) ABSTRACT

A sliding hinge including a torque module, two brackets, a support plate, a driving gear set, and a sliding bracket is provided. The torque module has a first shaft and a second shaft adapted to rotate in opposite directions and produce a torque. The brackets are respectively disposed on the first shaft and the second shaft. The support plate is disposed on one of the brackets. The driving gear set is disposed on the support plate and coupled to the first shaft. The sliding bracket is coupled to the driving gear set and slidably disposed on a top surface of the support plate. The brackets are adapted to rotate relative to the torque module by the first shaft and the second shaft, such that the brackets are overlapped or unfolded with each other while the driving gear set drives the sliding bracket to slide along the support plate.

12 Claims, 10 Drawing Sheets

(56) References Cited

U.S. PATENT DOCUMENTS

| | | | | |
|---|---|---|---|---|
| 8,713,757 B2* | 5/2014 | Chen | ................... | G06F 1/1624 |
| | | | | 16/354 |
| 9,540,855 B2* | 1/2017 | Kato | ...................... | E05D 3/122 |
| 10,146,266 B2* | 12/2018 | Shibayama | ............ | G06F 1/1618 |
| 10,208,842 B2* | 2/2019 | Chen | ....................... | F16H 25/08 |
| 10,678,312 B2* | 6/2020 | Hsu | ....................... | G06F 1/1656 |
| 2008/0109995 A1* | 5/2008 | Kuwajima | ............ | H04M 1/022 |
| | | | | 16/354 |
| 2011/0271486 A1* | 11/2011 | Wang | .................... | G06F 1/1681 |
| | | | | 16/319 |
| 2012/0212924 A1* | 8/2012 | Nakajima | ............. | G06F 1/1681 |
| | | | | 361/807 |
| 2014/0009874 A1* | 1/2014 | Huang | ................... | G06F 1/162 |
| | | | | 361/679.01 |
| 2015/0138713 A1* | 5/2015 | Onda | .................... | G06F 1/1643 |
| | | | | 361/679.27 |
| 2015/0159413 A1* | 6/2015 | Chen | ....................... | E05D 3/122 |
| | | | | 16/342 |
| 2018/0067520 A1* | 3/2018 | Maatta | ................... | G06F 1/1681 |
| 2018/0373296 A1* | 12/2018 | Wendt | .................... | E05D 11/082 |

* cited by examiner

SLIDING HINGE AND ELECTRONIC DEVICE HAVING THE SAME

CROSS REFERENCE TO RELATED APPLICATION

This application claims the priority benefit of U.S. provisional application Ser. No. 62/730,514, filed on Sep. 12, 2018. The entirety of the above-mentioned patent application is hereby incorporated by reference herein and made a part of this specification.

BACKGROUND

Technical Field

The disclosure relates to a hinge, and more particularly to a sliding hinge applicable for a dual screen electronic device.

Description of Related Art

Existing electronic devices such as tablet computers and notebook computers have developed a dual screen style, which is in line with the current trend of a large size display image. The dual screens are connected to each other by a hinge, are adapted to be unfolded or folded with each other, and switch to usage states of different situations. For example, in the unfolded state, the image may be synchronously outputted by the dual screens to increase the display range of the image. In the folded state, the dual screens are stacked up and down to reduce the area size of a portable electronic device, which is convenient for the user to hand carry or store in a backpack.

However, the existing dual screen electronic devices with hinges have a relatively large spacing in the unfolded state, which results in poor viewing effect of the outputted image, and part of the hinge is located in the spacing of the dual screens, such that the appearance of the unfolded electronic device is not pleasing. In this way, developing a hinge, configured to improve the disadvantages of excessive dual screen spacing and displeasing appearance of an electronic device, is an important development goal.

In order to solve the problem of excessive spacing between two screens of a dual screen model, the design of the present application allows the spacing between the two screens to be reduced by a design of a body and a screen which may slide relative to each other, so as to achieve a better viewing effect.

SUMMARY

The disclosure provides a sliding hinge, applicable for a dual screen electronic device, having a sliding function for reducing the spacing between the dual screens of the electronic device in the unfolded state to achieve a close proximity to each other, so as to obtain a better display effect and improve the appearance in the unfolded state.

The sliding hinge of the present invention includes a torque module, two brackets, a support plate, a driving gear set, and a sliding bracket. The torque module has a first shaft and a second shaft, which are adapted to rotate in opposite directions and produce a torque. The two brackets are respectively disposed on the first shaft and the second shaft. The support plate is disposed on one of the brackets. The driving gear set is disposed on the support plate and coupled to the first shaft. The sliding bracket is coupled to the driving gear set and slidably disposed on a top surface of the support plate. The two brackets are adapted to be rotated relative to the torque module by the first shaft and the second shaft, such that the two brackets are overlapped with each other or unfolded with each other while the driving gear set drives the sliding bracket to slide along the support plate. When the two brackets are overlapped with each other, the sliding bracket is relatively away from the first shaft. When the two brackets are unfolded with each other, the sliding bracket is relatively close to the first shaft.

The electronic device of the present invention includes a first body, a second body, and a sliding hinge. The first body includes a first outer casing and a first screen. The first screen is fixed onto the first outer casing. The second body includes a second outer casing and a second screen. The second screen is slidably disposed on the second outer casing. The sliding hinge is disposed on the first body and the second body, and includes a torque module, two brackets, a support plate, a driving gear set, and a sliding bracket. The torque module has a first shaft and a second shaft, which are adapted to rotate in opposite directions and produce a torque. The two brackets are respectively disposed on the first shaft and the second shaft, and respectively connected to the first outer casing and the second outer casing. The support plate is disposed on one of the brackets and located in the first outer casing. The driving gear set is disposed on the support plate and coupled to the first shaft. The sliding bracket is coupled to the driving gear set and slidably disposed on a top surface of the support plate. The second screen connects the sliding bracket. The two brackets are adapted to rotate relative to the torque module by the first shaft and the second shaft, such that the first body and the second body are overlapped with each other or unfolded with each other while the driving gear set drives the sliding bracket to slide along the support plate. When the first body and the second body are overlapped with each other, the sliding bracket is relatively away from the first shaft. When the first body and the second body are unfolded with each other to 180 degrees, the sliding bracket is relatively close to the first shaft, driving the first screen to slide toward the second screen and to be in close proximity to each other, so as to shield the torque module.

Based on the above, the sliding hinge of the present invention is coupled to the sliding bracket by the driving gear set. When the two brackets rotate with the first shaft and the second shaft in opposite directions and produce a torque, the driving gear set starts to rotate when the first shaft rotates, so as to drive the sliding bracket to slide along the support plate. When the two brackets are overlapped with each other, the sliding bracket is relatively away from the first shaft. When the two brackets are unfolded with each other, the sliding bracket is relatively close to the first shaft. In this way, during the unfolding and folding of the sliding hinge, the relative position of the sliding bracket on the support plate may be synchronously driven by the driving gear set.

Further, the sliding hinge of the present invention is adapted to connect the first screen and the second screen for the electronic device. The first body and the second body may rotate relative to the torque module to be overlapped with each other or unfolded with each other. When the first body and the second body are overlapped with each other, the sliding bracket is relatively away from the first shaft. When the first body and the second body are unfolded with each other to 180 degrees, the sliding bracket is relatively close to the first shaft, driving the first screen to slide toward the second screen and span over the first body and the second body, such that the first screen and the second screen

DETAILED DESCRIPTION OF DISCLOSED EMBODIMENTS

Figure 1A:
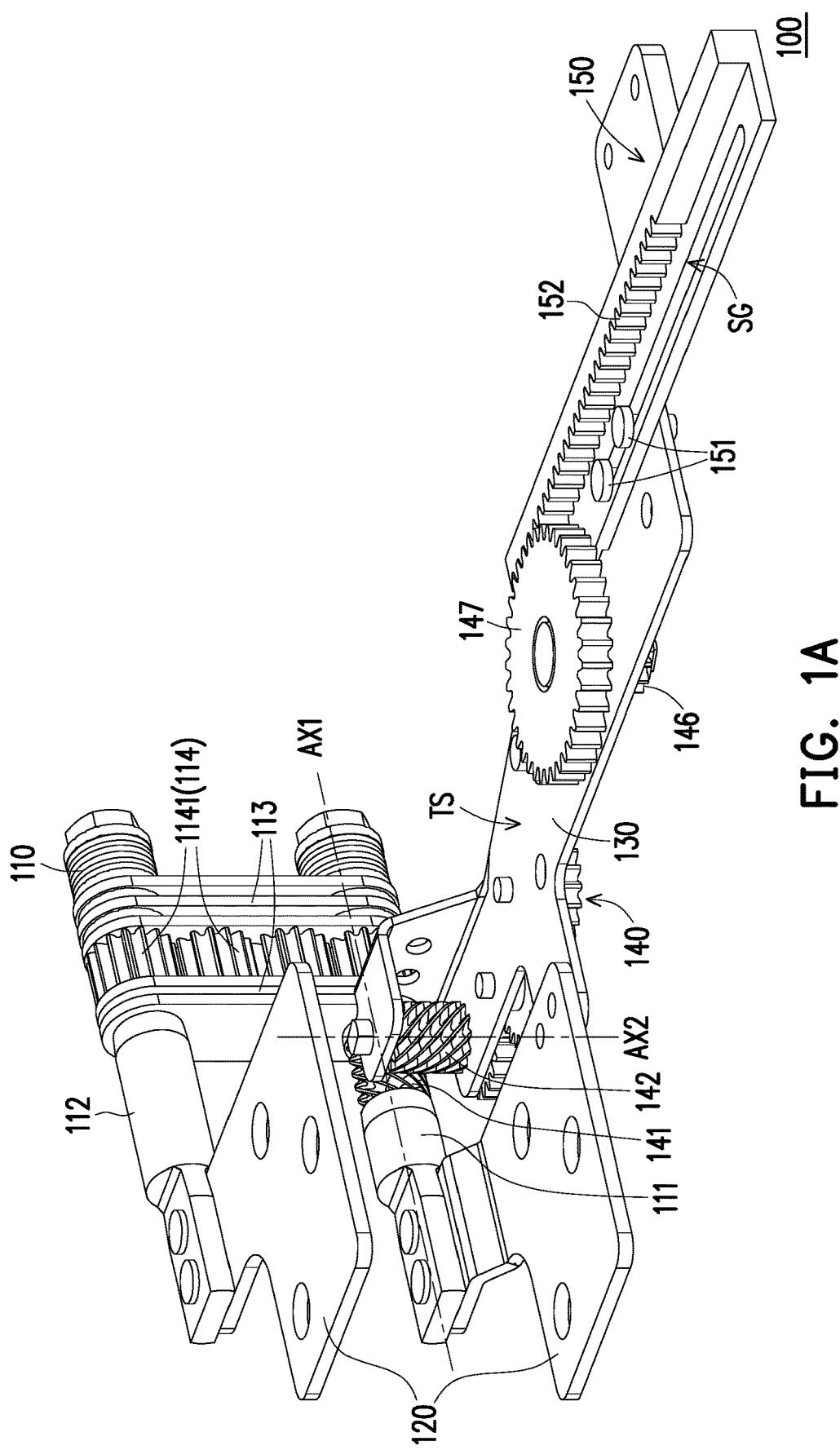
FIG. 1A is a perspective view of a sliding hinge according to an embodiment of the present invention.
Figure 1B:
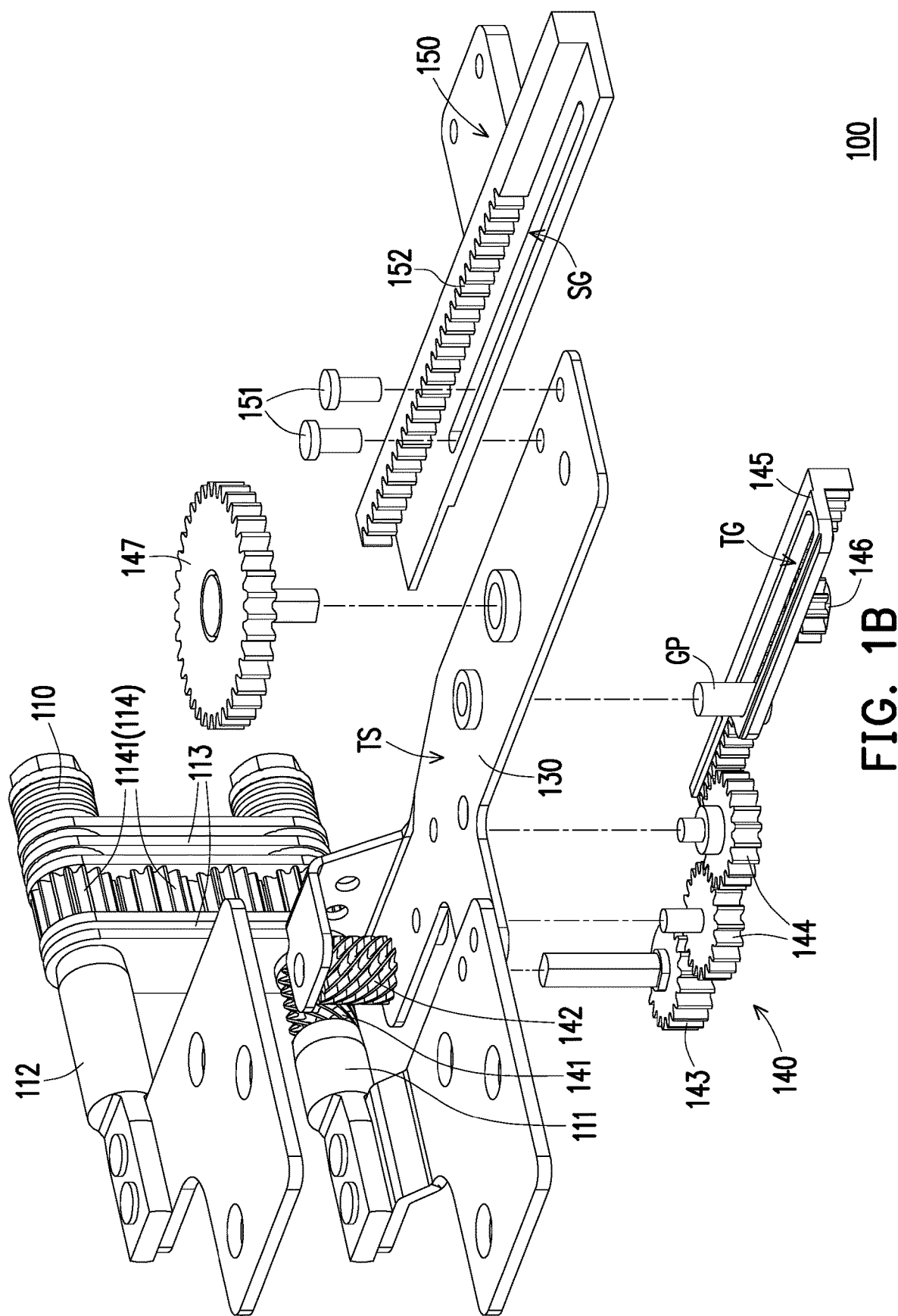
FIG. 1B is an exploded view of some elements of the sliding hinge of FIG. 1A.

FIG. 1A is a perspective view of a sliding hinge according to an embodiment of the present invention. FIG. 1B is an exploded view of some elements of the sliding hinge of FIG. 1A.

Figure 2A:
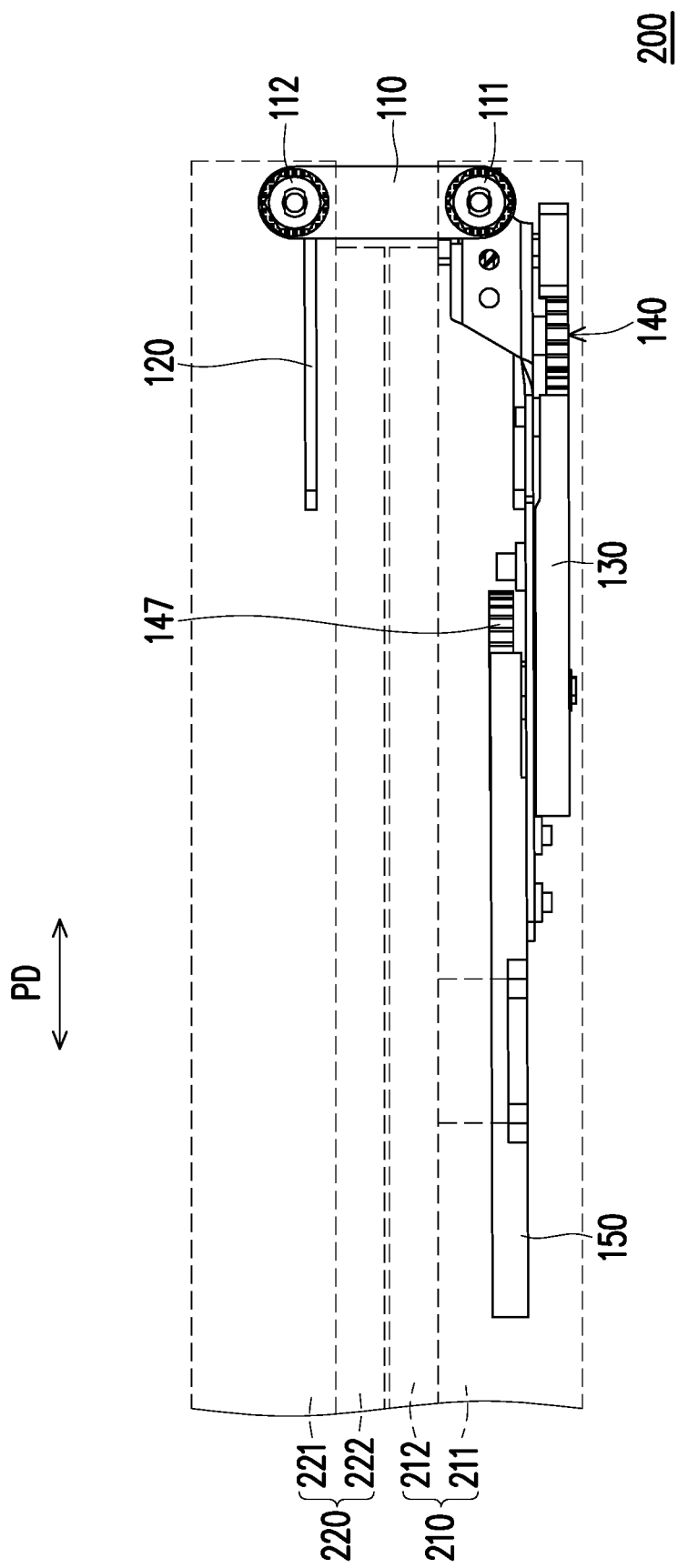
FIG. 2A to FIG. 2C are schematic diagrams showing a switching process of an electronic device between an overlapped state and an unfolded state.
Figure 2B:
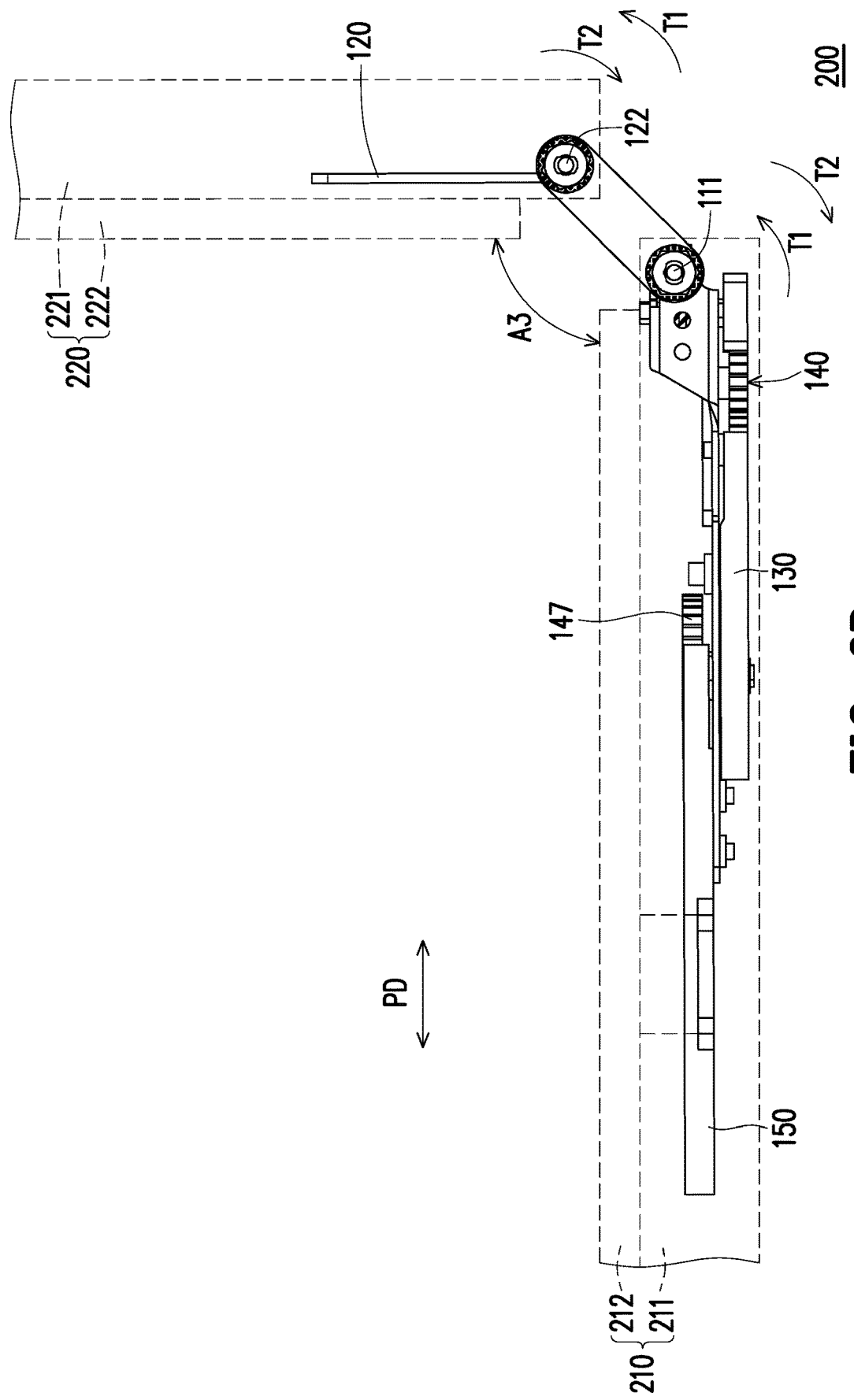
Figure 2C:
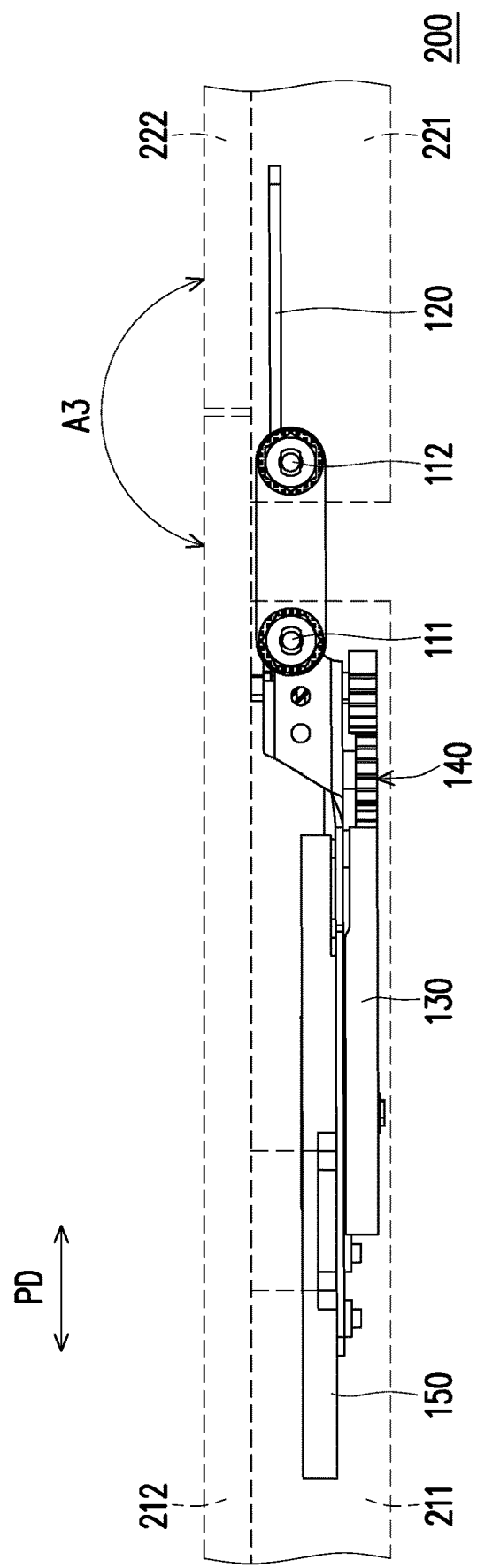
Figure 3A:
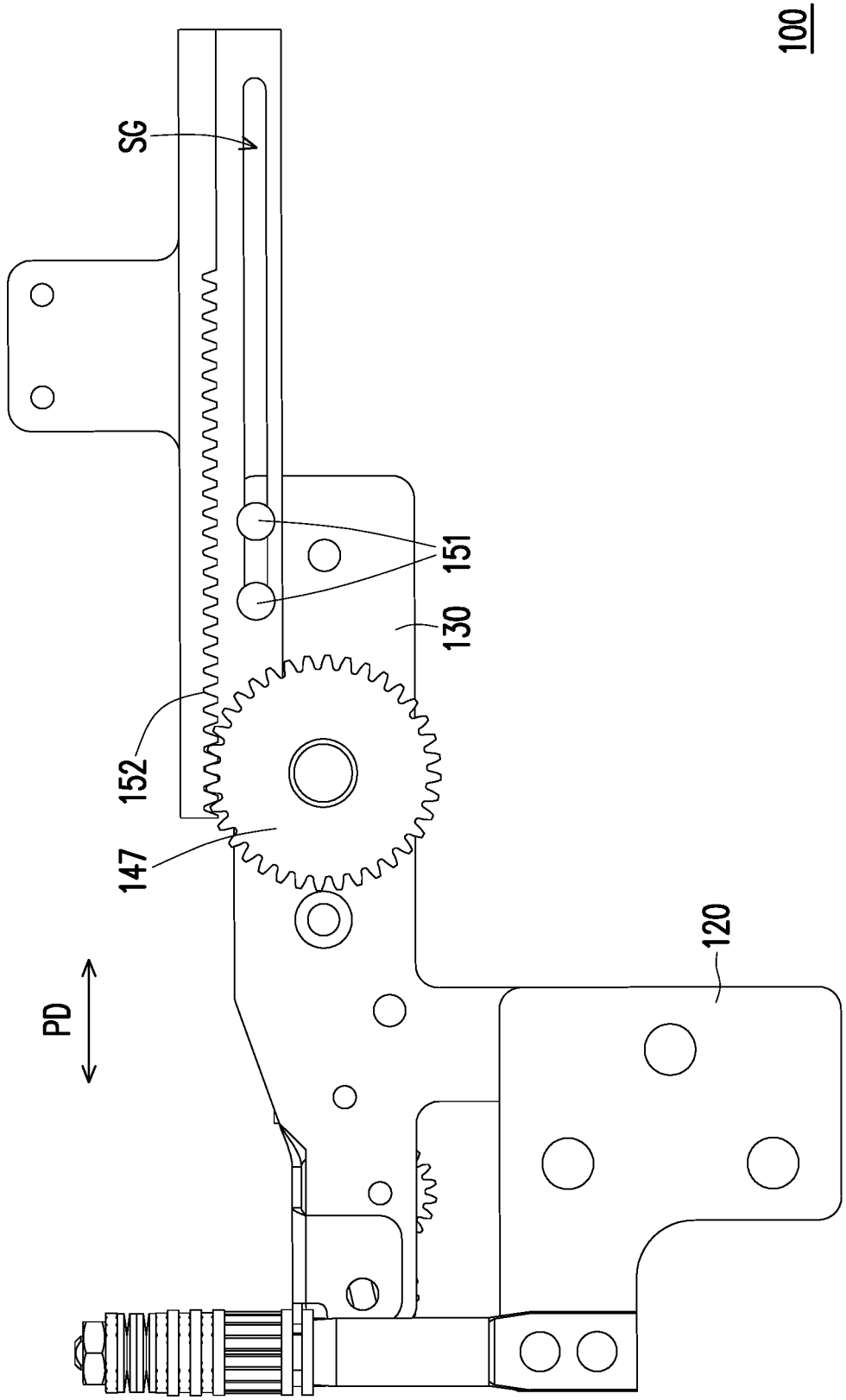
FIG. 3A is a top plan view of an overlapped state of the sliding hinge of FIG. 1A.
Figure 3B:
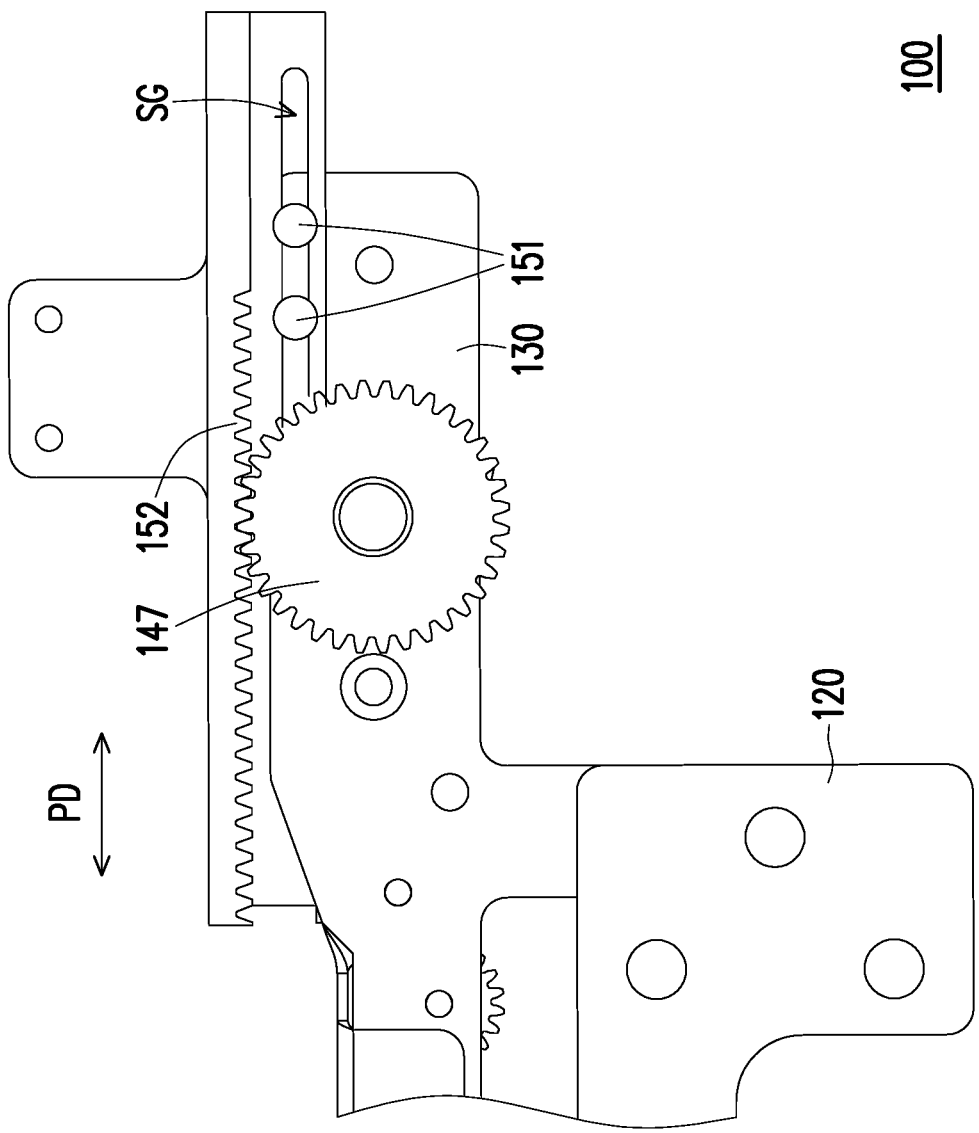
FIG. 3B is a top plan view of an unfolded state of the sliding hinge of FIG. 3A.
Figure 3C:
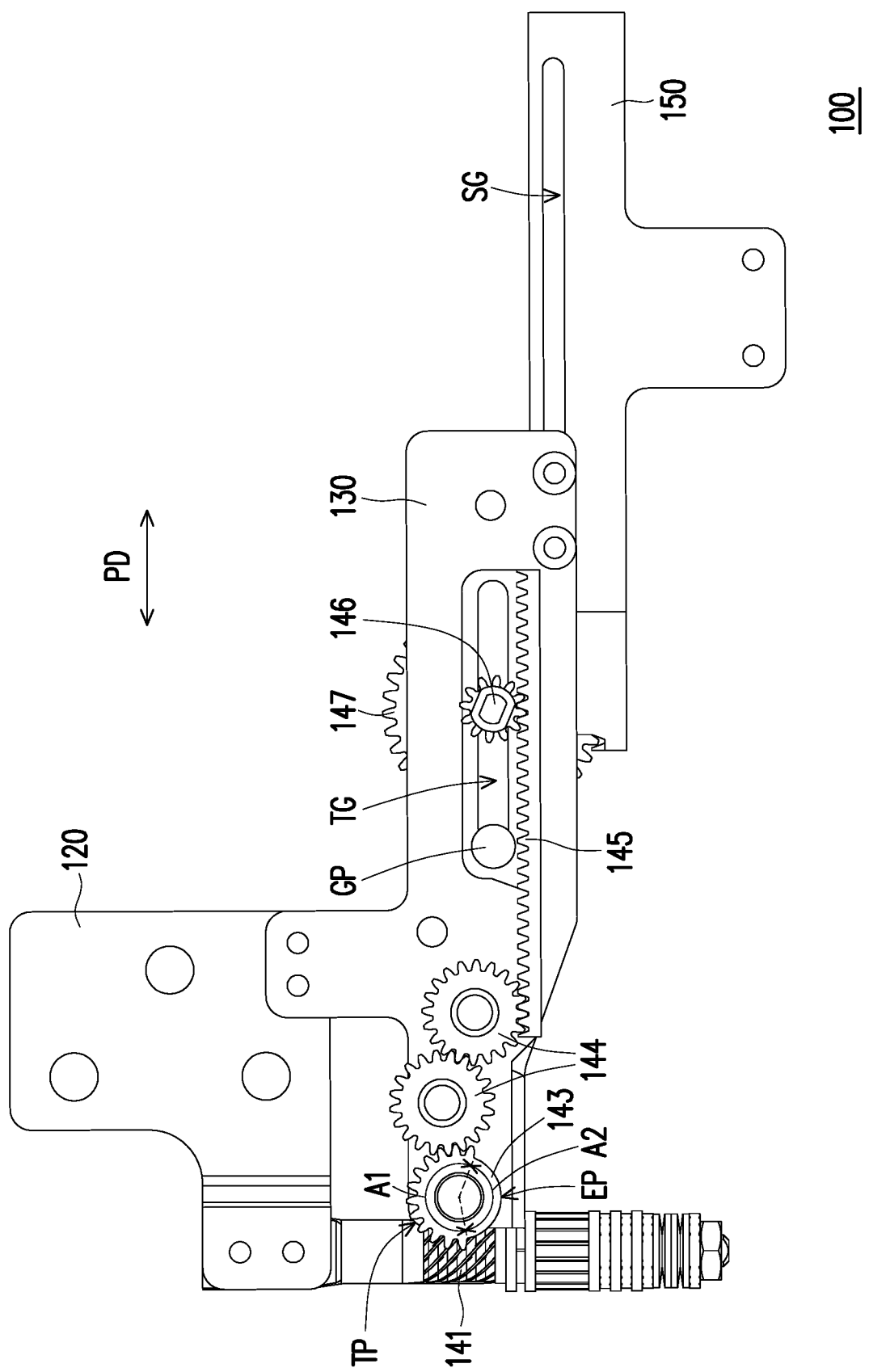
FIG. 3C is a bottom plan view of the overlapped state of the sliding hinge of FIG. 1A.
Figure 3D:
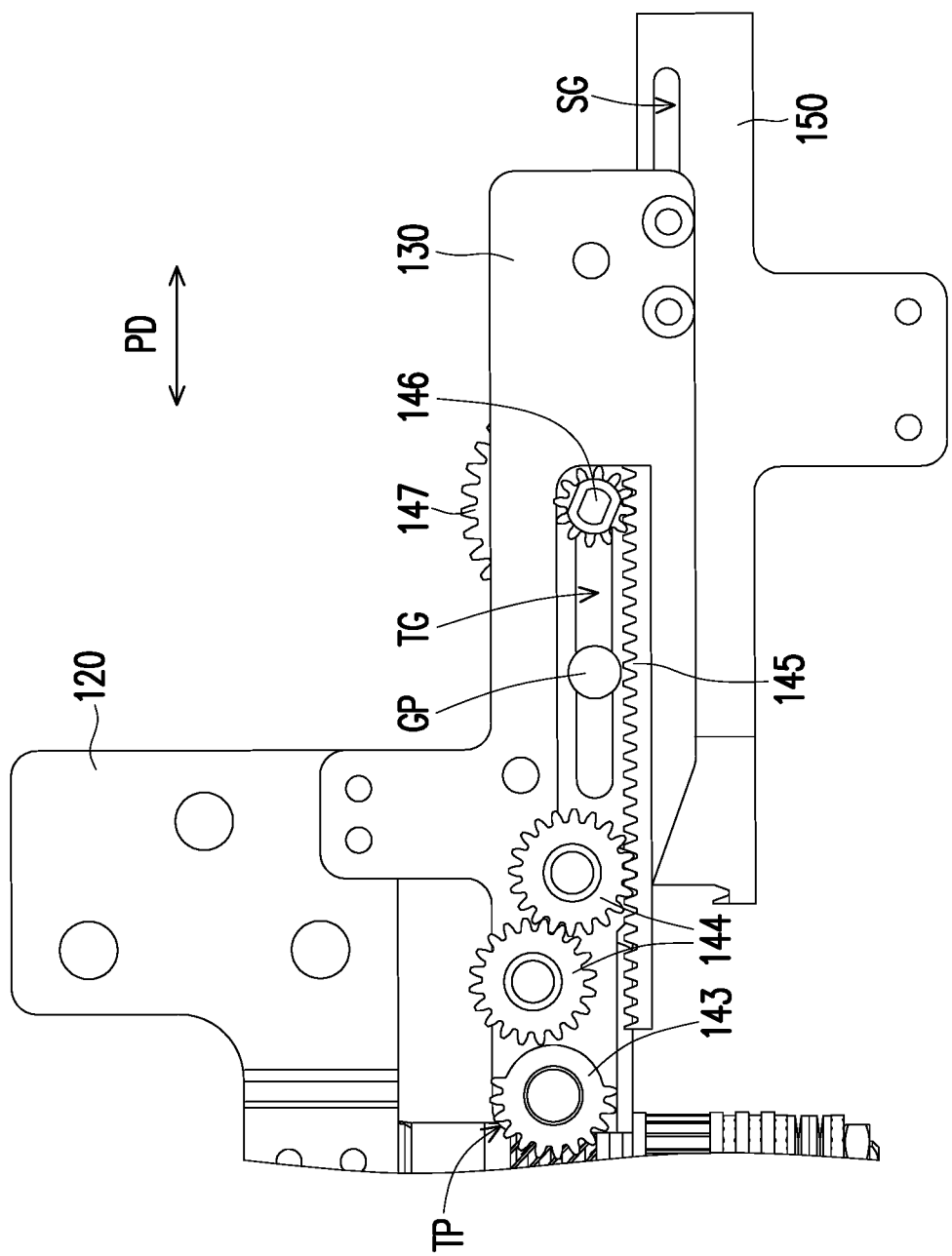
FIG. 3D is a bottom plan view of the unfolded state of the sliding hinge of FIG. 3C.

FIG. 2A to FIG. 2C are schematic diagrams showing a switching process of an electronic device between an overlapped state and an unfolded state. FIG. 3A is a top plan view of an overlapped state of the sliding hinge of FIG. 1A. FIG. 3B is a top plan view of an unfolded state of the sliding hinge of FIG. 3A. FIG. 3C is a bottom plan view of the overlapped state of the sliding hinge of FIG. 1A. FIG. 3D is a bottom plan view of the unfolded state of the sliding hinge of FIG. 3C.

Figure 1C:
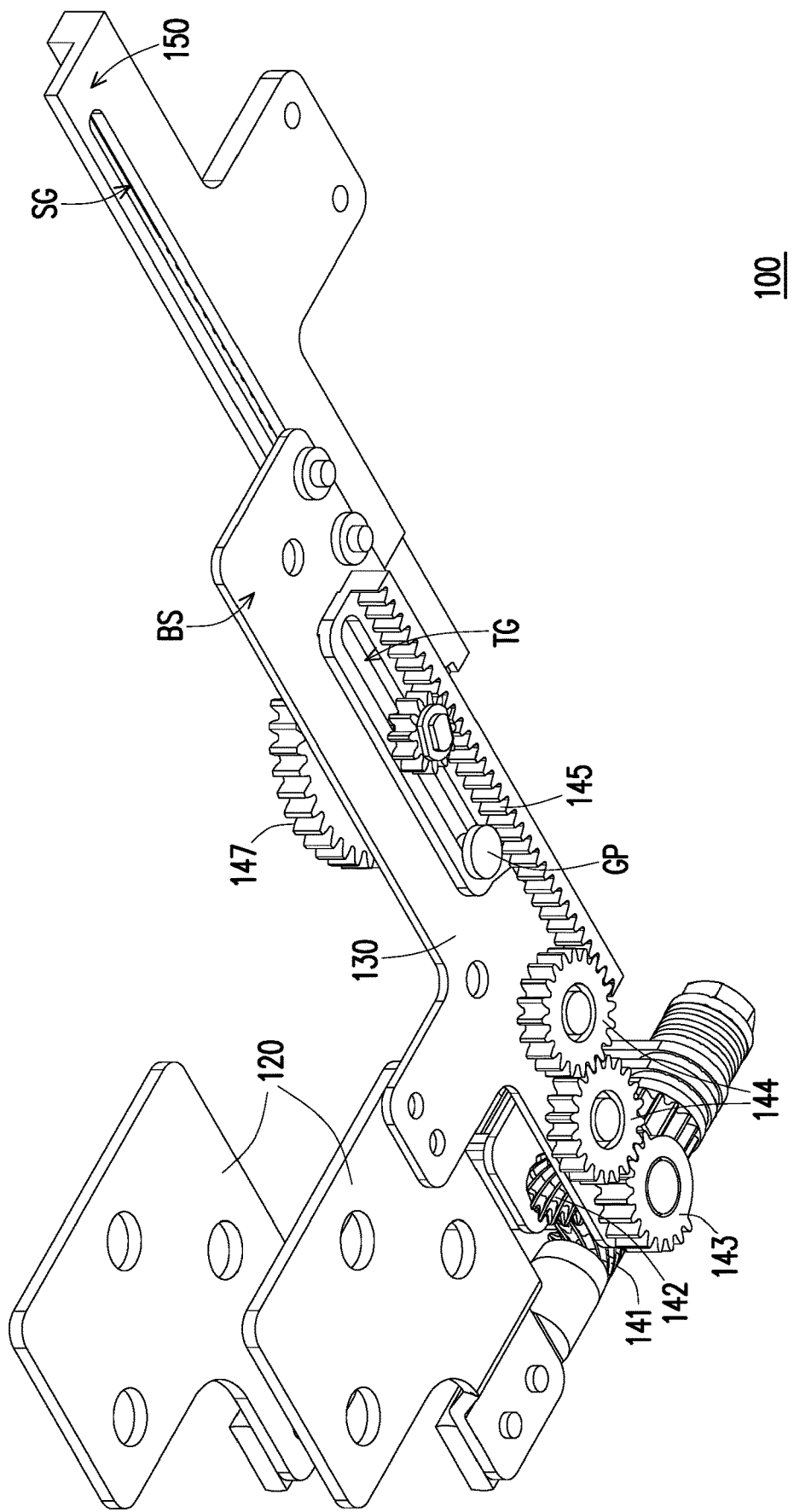
FIG. 1C is a perspective view of another direction of the sliding hinge of FIG. 1A.

Referring to FIG. 1A to FIG. 1C. A sliding hinge 100 of the present embodiment includes a torque module 110, two brackets 120, a support plate 130, a driving gear set 140, and a sliding bracket 150.

Referring to FIG. 2A to FIG. 2C, the sliding hinge 100 is applicable for an electronic device 200. The electronic device 200 includes a first body 210 and a second body 220. The electronic device 200 is, for example, a notebook computer, a tablet computer, or other similar products. In the present embodiment, the first body 210 includes a first outer casing 211 and a first screen 212. The first screen 212 is fixed onto the first outer casing 211. The second body 220 includes a second outer casing 221 and a second screen 222. The second screen 222 is slidably disposed on the second outer casing 221 and disposed on the sliding hinge 100. The first body 210 and the second body 220 may be switched to an unfolded state (see FIG. 2B for unfolding to 90 degrees and FIG. 2C for unfolding to 180 degrees) and an overlapped state (see FIG. 2A) by the sliding hinge 100.

Referring to FIG. 1A to FIG. 1C, the torque module 110 has a first shaft 111 and a second shaft 112 adapted to rotate in opposite directions and produce a torque. In detail, the torque module 110 has a plurality of clamps 113 and a rotating gear set 114. The first shaft 111 and the second shaft 112 are slidably passed through the plurality of clamps 113 and arranged parallel to each other. The rotating gear set 114 is sleeved on the first shaft 111 and the second shaft 112. The plurality of clamps 113 are interposed on two sides of the rotating gear set 114 and a torque is produced by a contact friction between the clamp 113 and the rotating gear set 114. In the present embodiment, the rotating gear set 114 includes an even number (four as shown in the drawings) of rotating gears 1141. The four rotating gears 1141 are engaged with each other and the two rotating gears 1141 located at the two ends of the rotating gear set 114 are respectively sleeve-fitted to the first shaft 111 and the second shaft 112.

With reference to FIG. 2B, here, the function of an even number of rotating gears 1141 is that when the first shaft 111 rotates toward a first direction T1, the second shaft 112 is driven by the rotating gear set 114 to rotate toward a second direction T2 opposite to the first direction T1. Vice versa, when the first shaft 111 rotates toward the second direction T2, the rotating gear set 114 drives the second shaft 112 to rotate toward the first direction T1.

The two brackets 120 are respectively disposed on the first shaft 111 and the second shaft 112, and are respectively connected to the first outer casing 211 and the second outer casing 221.

The support plate 130 is disposed on one of the brackets 120 and located in the first outer casing 211. The driving gear set 140 is disposed on the support plate 130 and coupled to the first shaft 111. The sliding bracket 150 is coupled to the driving gear set 140 and slidably disposed on a top surface TS of the support plate 130. The first screen 212 connects the sliding bracket 150.

Referring to FIG. 3A to FIG. 3D, the two brackets 120 are adapted to rotate relative to the torque module 110 by the first shaft 111 and the second shaft 112, such that the first body 210 and the second body 220 are overlapped with each other (see FIG. 2A) or unfolded with each other (see FIGS. 2B and 2C). At the same time, the driving gear set 140 drives the sliding bracket 150 to slide along the support plate 130. With reference to FIG. 2A, FIG. 3A, and FIG. 3C, when the first body 210 and the second body 220 are overlapped with each other, the sliding bracket 150 is relatively away from the first shaft 111. With reference to FIG. 2C, FIG. 3B, and FIG. 3D, when the first body 210 and the second body 220 are unfolded with each other to 180 degrees, the sliding bracket 150 is relatively close to the first shaft 111, driving the first screen 212 to slide toward the second screen 222 and to be in close proximity to each other, so as to shield the torque module 110.

Referring to FIG. 1A to FIG. 1C, the sliding bracket 150 has a sliding groove SG, a plurality of positioning posts 151, and a rack portion 152. The sliding groove SG is formed through the sliding bracket 150 and a plurality of positioning posts 151 (shown as two in the drawings) are passed through the sliding groove SG and fixedly connected to the support plate 130, wherein the plurality of positioning posts 151 may prevent the sliding bracket 150 from rotating, such that the sliding bracket 150 is adapted to slide linearly along the plurality of positioning posts 151 by the sliding groove SG. The rack portion 152 is disposed on the top surface TS of the sliding bracket 150 and parallel to the sliding groove SG. The driving gear set 140 is coupled to the rack portion 152. Referring to FIG. 3A and FIG. 3B, when the first shaft 111 rotates, the driving gear set 140 is adapted to drive the rack portion 152 to slide relative to the support plate 130 along a horizontal direction PD.

Further, the driving gear set 140 includes a first helical gear 141, a second helical gear 142, a first gear 143, two second gears 144, a rack base 145, a third gear 146, and a fourth gear 147.

The first helical gear 141 is sleeved on the first shaft 111 and rotates with the first shaft 111. The second helical gear 142 is pivotally connected to the top surface TS of the support plate 130 and engages with the first helical gear 141. A first axis AX1 of the first helical gear 141 is perpendicular to a second axis AX2 of the second helical gear 142. In the present embodiment, the first helical gear 141 and the second helical gear 142 are adapted to convert different rotational forces of different axes, so that the first shaft 111 may drive the gear set 140 to produce a corresponding rotation when rotating.

The first gear 143 connects the second helical gear 142 and is adapted to rotate coaxially. The first gear 143 is located on a bottom surface BS of the support plate 130. The two second gears 144 are pivotally connected to the bottom surface BS of the support plate 130 and engaged with each other, wherein one of the second gears 144 engages with the first gear 143. The rack base 145 is slidably disposed on the bottom surface BS of the support plate 130, and the rack base 145 engages with the second gear 144 away from the first gear 143. The third gear 146 is pivotally connected to the support plate 130 and engages with the rack base 145. The fourth gear 147 connects the third gear 146 and is adapted to rotate coaxially. The fourth gear 147 is located on the top surface TS of the support plate 130 and engages with the rack portion 152 of the sliding bracket 150.

Referring to FIG. 1B, FIG. 1C, FIG. 3C, and FIG. 3D. Further, the rack base 145 has a through groove TG and a guiding post GP. The guiding post GP is passed through the through groove TG and fixedly connected to the support plate 130. The third gear 146 is disposed outside the through groove TG and spaced apart from the guiding post GP. The rack base 145 is adapted to slide linearly along the guiding post GP by the through groove TG.

The first gear 143 is adapted to rotate driving the two second gears 144, such that the rack base 145 slides relative to the support plate 130, and the rack base 145 synchronously drives the third gear 146 and the fourth gear 147 to rotate, and then drives the rack portion 152 of the sliding bracket 150 with the fourth gear 147.

Referring to FIG. 3A and FIG. 3C, the first gear 143 of the driving gear set 140 has a tooth portion TP and a smooth portion EP formed on an outer ring surface of the first gear 143. A distribution angle A1 of the tooth portion TP is larger than a distribution angle A2 of the smooth portion EP.

With reference to FIG. 2A and FIG. 2B, when an included angle A3 of the two brackets 120 is between 0 to 90 degrees, that is, the first body 210 and the second body 220 of the electronic device 200 unfold from the overlapped state to 90 degrees, the smooth portion EP of the first gear 143 faces the second gear 144, such that the first gear 143 is uncoupled from the second gear 144 during a rotational process without driving the second gear 144. The sliding bracket 150 is stationary when the included angle A3 is between 0 to 90 degrees and the first screen 212 does not slide relative to the first outer casing 211.

Referring to FIG. 3B, FIG. 3D, and FIG. 2C, when the included angle A3 of the two brackets 120 is between 90 to 180 degrees, that is, the first body 210 and the second body 220 of the electronic device 200 continue to unfold from the unfolded 90 degrees to 180 degrees. The tooth portion TP of the first gear 143 faces the second gear 144, such that the first gear 143 engages with the second gear 144 during a rotational process and starts to drive the second gear 144. The sliding bracket 150 slides toward the first shaft 111 and drives the first screen 212 to slide relative to the first outer casing 211 when the included angle A3 is between 90 to 180 degrees, and eventually spans over the first outer casing 211 and the second outer casing 221, so as to be in close proximity to the second screen 222.

In addition, when the two brackets 120 are overlapped with each other, one end of the through groove TG of the rack base 145 facing the first shaft 111 is abutted against the guiding post GP (see FIG. 3C) and one end of the sliding groove SG of the sliding bracket 150 facing the first shaft 111 is abutted against one of the positioning posts 151 (see FIG. 3A). On the contrary, when the two brackets 120 are unfolded with each other, one end of the through groove TG of the rack base 145 facing the rotating shaft 111 is away from the guiding post GP (see FIG. 3D) and one end of the sliding groove SG of the sliding bracket 150 facing the first shaft 111 is away from one of the positioning posts 151 (see FIG. 3B). The limiting effect of the through groove TG is configured to limit the sliding routes of the sliding bracket 150 and the rack base 145 by the sliding groove SG, the guiding post GP, and the positioning posts 151.

Based on the above, the sliding hinge of the present invention is coupled to the sliding bracket by the driving gear set. When the two brackets rotate with the first shaft and the second shaft in opposite directions and produce a torque, the driving gear set starts to rotate when the first shaft rotates, so as to drive the sliding bracket to slide along the support plate. When the two brackets are overlapped with each other, the sliding bracket is relatively away from the first shaft. When the two brackets are unfolded with each other, the sliding bracket is relatively close to the first shaft. In this way, during the unfolding and folding of the sliding hinge, the relative position of the sliding bracket on the support plate may be synchronously driven by the driving gear set.

Further, the sliding hinge of the present invention is adapted to connect the first screen and the second screen for the electronic device. The first body and the second body may rotate relative to the torque module to be overlapped with each other or unfolded with each other. When the first body and the second body are overlapped with each other, the sliding bracket is relatively away from the first shaft. When the first body and the second body are unfolded with each other to 180 degrees, the sliding bracket is relatively close to the first shaft, driving the first screen to slide toward the second screen and span over the first body and the second body, such that the first screen and the second screen are in close proximity to each other, so as to shield the torque module. Thereby, a better image display effect is achieved and the aesthetics of the electronic device is improved.

What is claimed is:

1. A sliding hinge, comprising:
   a torque module, having a first shaft and a second shaft adapted to rotate in opposite directions and produce a torque;
   two brackets, respectively disposed on the first shaft and the second shaft and adapted to move between an overlapped position and an unfolded position;
   a support plate, disposed on one of the two brackets;
   a driving gear set, disposed on the support plate and coupled to the first shaft; and
   a sliding bracket, coupled to the driving gear set and slidably disposed on a top surface of the support plate, wherein
   the two brackets are adapted to rotate relative to the torque module by the first shaft and the second shaft, such that the two brackets are overlapped with each other or unfolded with each other while the driving gear set drives the sliding bracket to slide along the support plate, when the two brackets are overlapped with each other, the sliding bracket is relatively away from the first shaft, and when the two brackets are unfolded with each other, the sliding bracket is relatively close to the first shaft.

2. The sliding hinge according to claim 1, wherein the torque module has a plurality of clamps and a rotating gear set, the first shaft and the second shaft are slidably passed through the plurality of clamps and arranged parallel to each other, the rotating gear set is sleeved on the first shaft and the second shaft, and the plurality of clamps are clamped on two sides of the rotating gear set.

3. The sliding hinge according to claim 2, wherein the rotating gear set comprises an even number of rotating gears, the plurality of rotating gears are engaged with each other, and two of even number of the rotating gears located on the two ends of the rotating gear set are respectively sleeve-fitted on the first shaft and the second shaft.

4. The sliding hinge according to claim 1, wherein the sliding bracket has a sliding groove and a plurality of positioning posts, the plurality of positioning posts are passed through the sliding groove and fixedly connected to the support plate, and the sliding bracket is adapted to slide along the plurality of positioning posts by the sliding groove.

5. The sliding hinge according to claim 4, wherein the sliding bracket has a rack portion, disposed on a side surface of the sliding bracket and parallel to the sliding groove, the driving gear set is coupled to the rack portion, and when the first shaft rotates, the driving gear set is adapted to drive the rack portion to slide relative to the support plate along a horizontal direction.

6. The sliding hinge according to claim 4, wherein the driving gear set comprises a first helical gear and a second helical gear, the first helical gear is sleeved on the first shaft, the second helical gear is pivotally connected to the support plate and engaged with the first helical gear, and a first axis of the first helical gear is perpendicular to a second axis of the second helical gear.

7. The sliding hinge according to claim 6, wherein the driving gear set further comprises:
a first gear, connected to the second helical gear and adapted to rotate coaxially;
two second gears, pivotally connected to the support plate and engaged with each other, wherein one of the two second gears engages with the first gear;
a rack base, slidably disposed on a bottom surface of the support plate relative to the top surface and engaged with the second gear away from the first gear;
a third gear, pivotally connected to the support plate and engaged with the rack base; and
a fourth gear, connected to the third gear and adapted to rotate coaxially, located on the top surface of the support plate, and coupled to the sliding bracket, wherein
the first gear rotates to drive the two second gears, such that the rack base slides relative to the support plate and synchronously drives the third gear and the fourth gear to rotate, and then the sliding bracket is driven by the fourth gear.

8. The sliding hinge according to claim 7, wherein the rack base has a through groove and a guiding post, the guiding post is passed through the through groove and fixedly connected to the support plate, the third gear is disposed outside the through groove and spaced apart from the guiding post, and the rack base is adapted to slide linearly along the guiding post by the through groove.

9. The sliding hinge according to claim 7, wherein the first gear has a tooth portion and a smooth portion, and a distribution angle of the tooth portion is greater than a distribution angle of the smooth portion.

10. The sliding hinge according to claim 9, wherein when an included angle of the two brackets is between 0 to 90 degrees, the smooth portion of the first gear faces the second gear, such that the first gear is uncoupled from the second gear during a rotational process.

11. The sliding hinge according to claim 9, wherein when an included angle of the two brackets is between 90 to 180 degrees, the tooth portion of the first gear faces the second gear, such that the first gear engages with the second gear during a rotational process.

12. An electronic device, comprising:
a first body, comprising a first outer casing and a first screen, the first screen being slidably disposed on the first outer casing;
a second body, comprising a second outer casing and a second screen, the second screen being fixed to the second outer casing; and
a sliding hinge, disposed on the first body and the second body, comprising:
a torque module, having a first shaft and a second shaft adapted to rotate in opposite directions and produce a torque;
two brackets adapted to move between an overlapped position and an unfolded position, respectively disposed on the first shaft and the second shaft, and respectively connecting the first outer casing and the second outer casing;
a support plate, disposed on one of the two brackets and located on the first outer casing;
a driving gear set, disposed on the support plate and coupled to the first shaft; and
a sliding bracket, coupled to the driving gear set and slidably disposed on a top surface of the support plate, the first screen connected to the sliding bracket,
wherein, the two brackets are adapted to rotate relative to the torque module by the first shaft and the second shaft, such that the first body and the second body are overlapped or unfolded with each other while the driving gear set drives the sliding bracket to slide along the support plate, when the first body and the second body are overlapped with each other, the sliding bracket is relatively away from the first shaft, and when the first body and the second body are unfolded with each other to 180 degrees, the sliding bracket is relatively close to the first shaft, driving the first screen to move toward the second screen and to be in close proximity to each other, so as to shield the torque module.

* * * * *